United States Patent [19]

Bhagat et al.

[11] Patent Number: 5,550,911
[45] Date of Patent: Aug. 27, 1996

[54] ADJUNCT CALL HANDLING FOR ACCESSING ADJUNCT-BASED CAPABILITIES PLATFORM

[75] Inventors: Promod K. Bhagat, Morganville; Warren R. Moe, Atlantic Highlands; William T. Shampine, Freehold, all of N.J.

[73] Assignee: Lucent Technologies Inc., Murray Hill, N.J.

[21] Appl. No.: 346,123

[22] Filed: Nov. 29, 1994

[51] Int. Cl.⁶ .............................. H04M 3/42; H04M 7/00
[52] U.S. Cl. .................... 379/220; 379/207; 379/221; 379/229; 379/268
[58] Field of Search ........................... 379/93, 94, 112, 379/113, 201, 207, 220, 221, 225, 268, 229

[56] References Cited

U.S. PATENT DOCUMENTS

| | | | |
|---|---|---|---|
| 4,924,510 | 5/1990 | Le | 379/221 |
| 5,086,460 | 2/1992 | Ash et al. | 379/221 |
| 5,101,451 | 3/1992 | Ash et al. | 379/221 |
| 5,136,636 | 8/1992 | Wegrzynowicz | 379/207 |
| 5,335,268 | 8/1994 | Kelly, Jr. et al. | 379/112 |
| 5,377,186 | 12/1994 | Wegner et al. | 379/201 |
| 5,390,242 | 2/1995 | Bales et al. | 379/221 |
| 5,394,463 | 2/1995 | Fischell et al. | 379/201 |
| 5,418,844 | 5/1995 | Morrisey et al. | 379/207 |
| 5,432,845 | 7/1995 | Burd et al. | 379/207 |
| 5,452,350 | 9/1995 | Reynolds et al. | 379/220 |

*Primary Examiner*—Jeffery Hofsass
*Assistant Examiner*—Daniel Hunter

[57] ABSTRACT

A method to allow certain types of adjunct applications for telecommunications networks that require caller interaction during call setup to temporarily access the adjunct and then be released back to the network for routing to the final destination. Specifically, when the call enters the network, the network originating switch redirects certain calls to the adjunct. The adjunct may be locally homed directly off the originating switch or may be homed remotely off a centrally located switch. Once the call has been routed to the adjunct and caller interaction has been completed, the adjunct releases the voice connection back to the switch which then routes the call to its final destination.

28 Claims, 8 Drawing Sheets

LOGICAL FLOW OF ADJUNCT USE DETERMINATION FUNCTIONS

FIG. 8

ADJUNCT CALL HANDLING FOR ACCESSING ADJUNCT-BASED CAPABILITIES PLATFORM

BACKGROUND OF THE INVENTION

1. Field of the Invention

The present invention relates to the routing of calls in complex telecommunications networks, and more particularly to the routing of calls requiring adjunct-based applications.

2. Description of the Related Art

With the development of complex telecommunications networks, such as AT&T's Switched Network, there continues to be a growing demand for customized call treatment that provides customers with a variety of services through the telecommunications network on calls to general destination numbers. These services may include, but are not limited to, customized billing, call forwarding, answering services, voice messaging, etc.

Since the computer processing switches that route calls within the telecommunications network typically lack sufficient capability to process these customized services, separate processors, referred to as adjuncts and well known in the art, have been incorporated into the network to assist in providing switch service features and capabilities. Accordingly, the service logic and customer records necessary for processing these customized features reside primarily in the adjuncts interfacing with the network.

To access these customized services, a caller would typically be required to specify that an adjunct was required for a particular call by dialing a specific telephone number, i.e., a 1-800-xxx-xxxx telephone number, in order to access the adjunct for that particular customized service. Once connected to the adjunct, the caller would then be required to dial the destination or termination telephone number, which is the telephone number that the caller ultimately wishes to be connected to.

Figure 1:
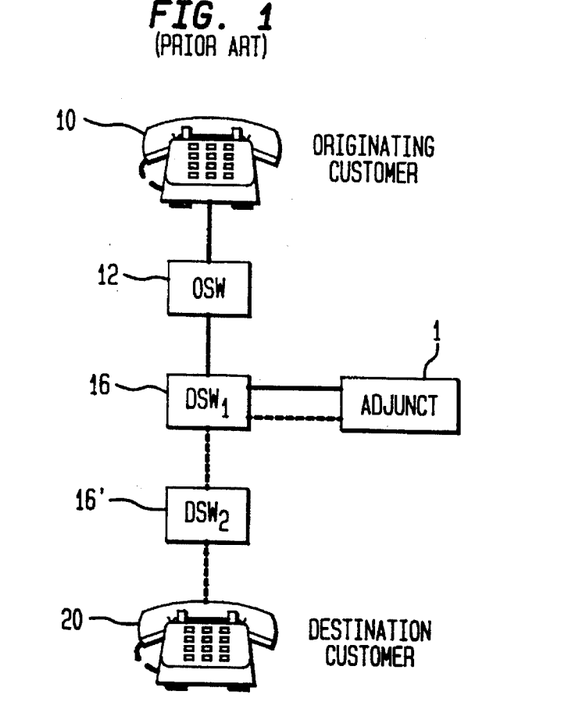
FIG. 1 is an illustration of the prior art system for routing of a call through an adjunct to its final destination number.

In the prior art method of accessing an adjunct as illustrated in FIG. 1, the customer identified the need for and type of adjunct required by dialing a specific telephone number that is not the destination number ultimately desired by that customer. The call would be routed from an originating or access switch (OSW) in the network (and possibly through other switches) to the adjunct that processes the particular customer service application sought by the caller. Once connected to the adjunct, the caller then typically dials the destination number and the call is routed through the adjunct and possibly other switches to the terminating or destination switch (DSW) to complete the call to the particular destination number.

This prior art method of accessing the customized service is prohibitive, costly and inefficient for several reasons. For instance, the responsibility for identifying the need to access an adjunct to process a particular customer service is borne by the customer rather than the network itself.

The adjunct in the prior art system was also required to stay on-line during the entire connect time of the call to the destination number, regardless of whether the adjunct had completed the processing of the customer service application and was no longer necessary.

Additionally, since the adjunct remains on-line during the entire call, the communication paths or trunks to and from the adjunct and switches also remain unavailable during the entire length of the call, thereby tying up valuable network resources.

Finally, in the event that the adjunct associated with the particular application or the network path fails or is otherwise unavailable, the call is terminated because there exists no backup or alternate routing capability in the prior art method.

SUMMARY OF INVENTION

The foregoing problems and deficiencies are solved and an advance is made in the art in accordance with the present invention by routing calls requiring adjunct-based application to local or remote adjuncts that are capable of processing the particular customer-based application for a given call.

In accordance with an embodiment of the present invention, a method is provided for accessing an adjunct for handling adjunct-based applications in a telecommunications network. The present invention provides for accessing a local adjunct connected to an originating switch (OSW) or an adjunct that is remote from the OSW when the local adjunct is unavailable.

First, the OSW must determine whether a given incoming telephone call requires an adjunct based upon matching actual call data to customer-specific data maintained in the switch.

In the event that an adjunct may be required for a given call, the OSW must determine the type of adjunct that may be necessary to process the adjunct-based application for that given telephone call and identify the logical address of the adjunct capable of processing said application based upon the type of adjunct required.

Based upon the logical address of the adjunct capable of processing the application, the OSW determines whether a local or a remote adjunct is required. For a remote adjunct, the OSW identifies a hand-off switch (HSW) having a communication path to the remote adjunct and selects a route from the OSW to the HSW. The OSW hands off the call to the HSW and transmits data to the HSW.

Once the call is routed to the HSW, information is transmitted between the HSW and the remote adjunct to process the adjunct-based application for the particular call. For a local adjunct, information is similarly transferred between the OSW and local adjunct to process the adjunct-based application. The adjunct (local or remote) is responsible for determining the operating mode of the adjunct based upon customer-specific application data contained in the adjunct.

DESCRIPTION OF THE PREFERRED EMBODIMENTS

The principles of the present invention are illustrated in a preferred embodiment which provides an adaptive routing scheme for accessing an adjunct for handling adjunct-based applications from an originating or access switch (OSW) 12 or a destination or termination switch (DSW) 16.

Figure 2A:
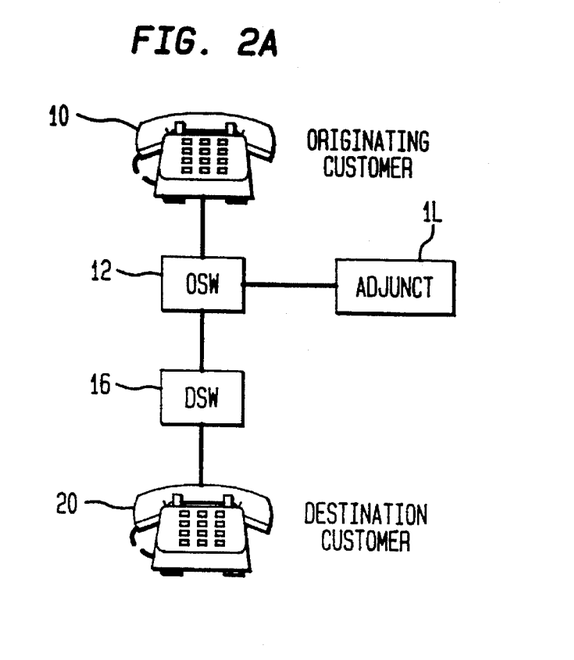
FIG. 2A is an illustration of the system for routing a call through a local adjunct to its final destination number in accordance with the present invention.
Figure 2B:
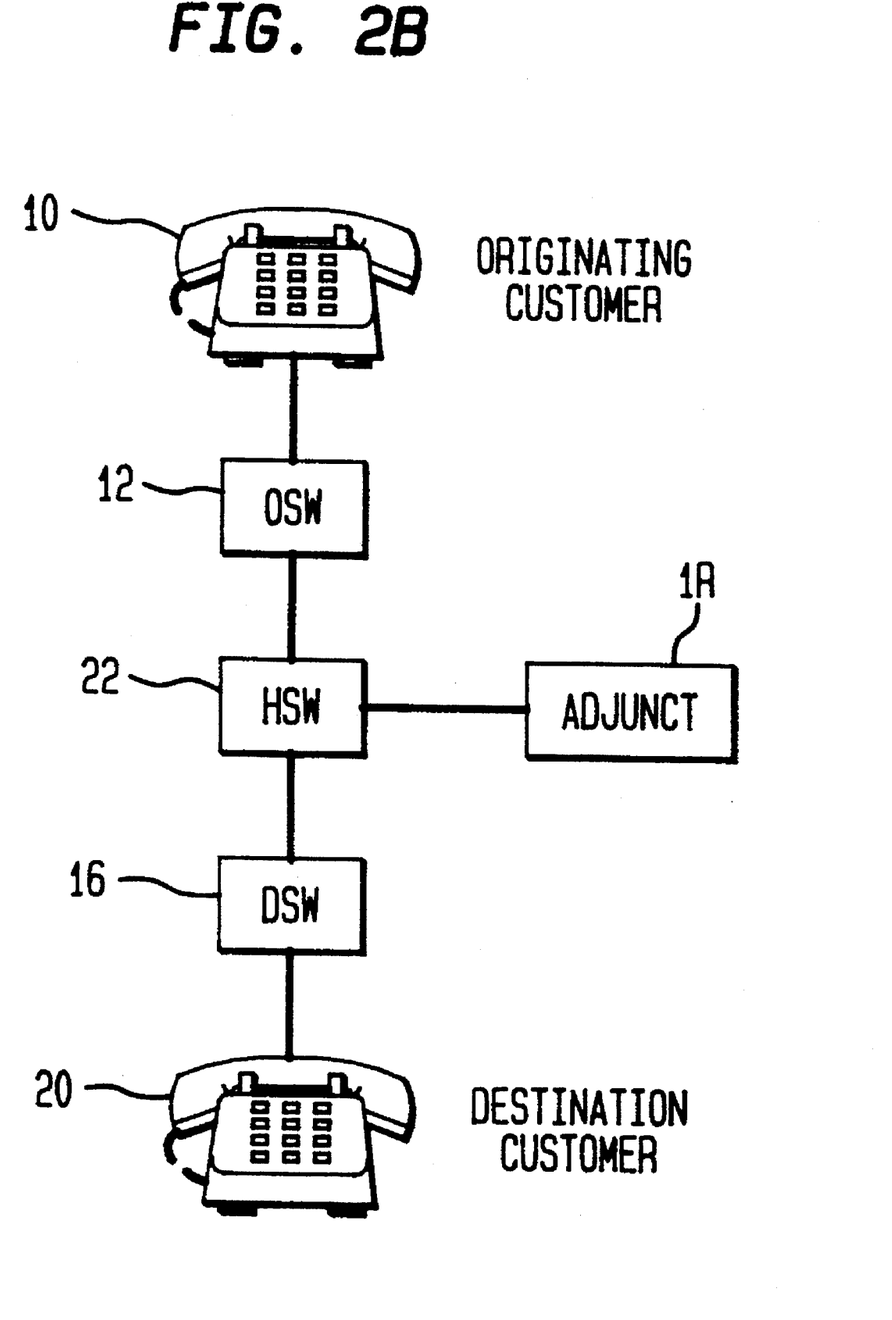
FIG. 2B is an illustration of the system for routing a call through a remote adjunct to its final destination number in accordance with the present invention.

Referring to FIGS. 2A and 2B and in accordance with the present invention, an originating call 10 entering a network is routed through the normal prior art switching process to OSW 12, such as AT&T's 4ESS™ Switch. OSW 12 has sufficient memory to maintain an Automatic Number Identification (ANI) based trigger table to support the adjunct access trigger function as will be described below. An ANI refers to a billing number, such as that corresponding to the originating call telephone number.

In normal operation, the telecommunication network consists of a plurality of switches that route a telephone call from OSW 12 to DSW 16. DSW 16 is the switch in the network corresponding to the destination number dialed by the caller. The routing of a call from an OSW 12 to a DSW 16 can be through a direct trunk or through intermediate switches (not shown). The method for determining this routing is known in the art as Real Time Network Routing (RTNR) and is fully described in U.S. Pat. No. 5,101,451.

Figure 7:
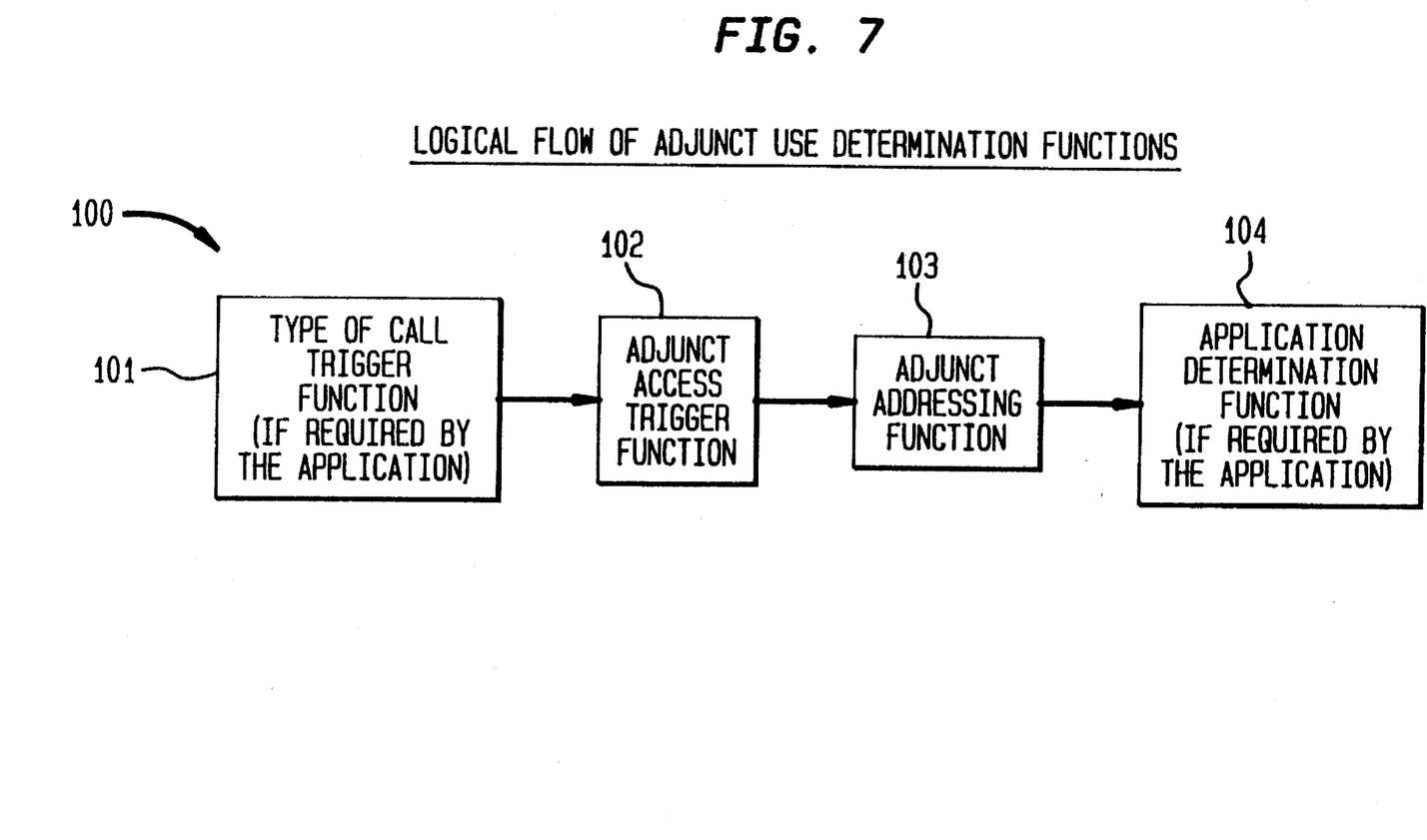
FIG. 7 is a logical flow diagram of the adjunct use determination function of the present invention.

In accordance with the present invention, OSW 12 is responsible for determining whether an adjunct is necessary to process an adjunct-based application for a given telephone call. An Adjunct Use Determination Function 100 to be performed by OSW 12 is illustrated in FIG. 7.

Figure 3A:
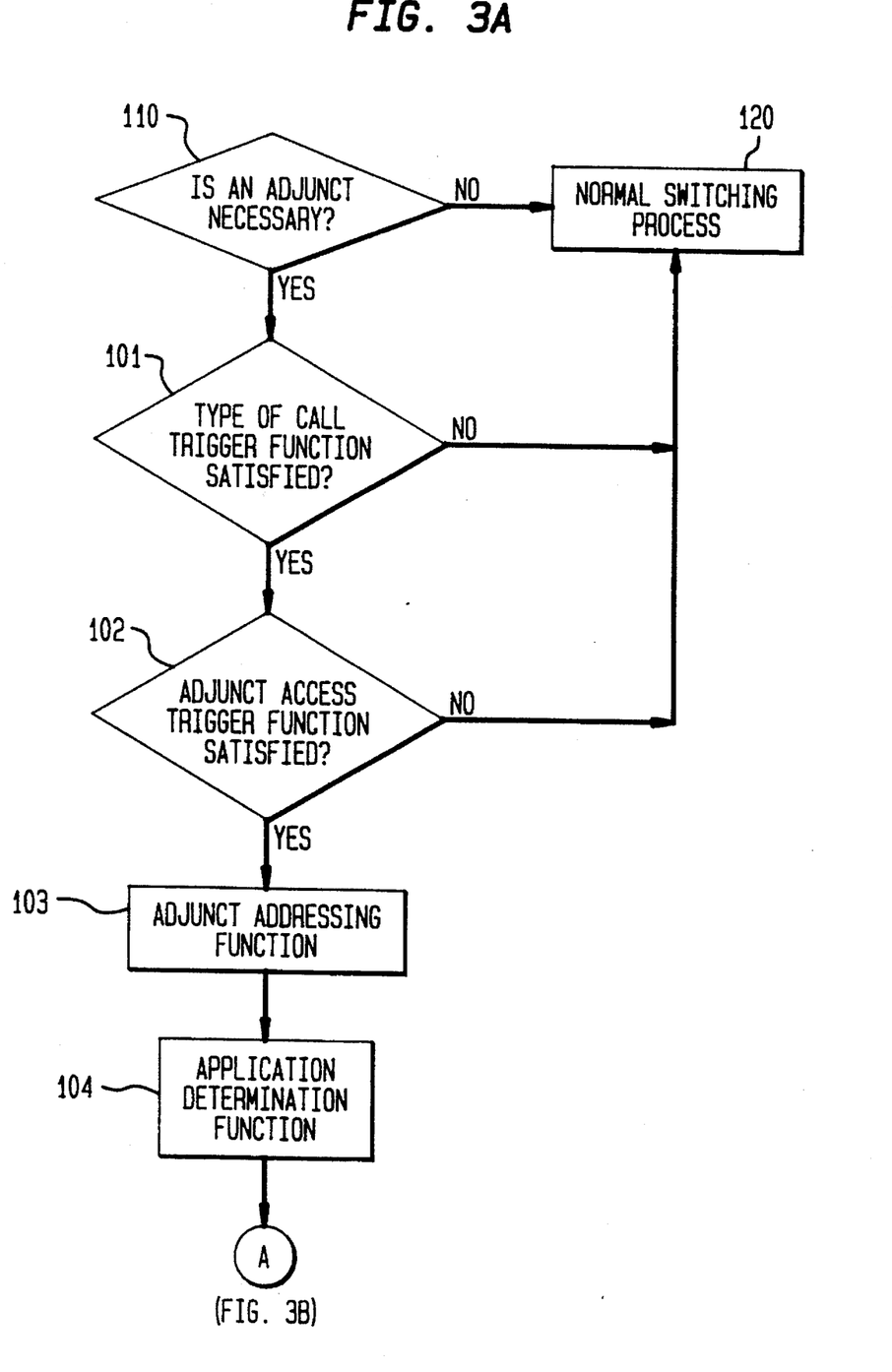
FIGS. 3A and 3B are flow charts of the system for routing a call to an adjunct in accordance with the present invention.

As part of the Adjunct Use Determination Function 100, OSW 12 may first perform a type of call trigger function 101 to make an initial determination as to whether an incoming call to OSW 12 is a type of call for which an initial database check should be performed. Referring to FIGS. 3A and 7, if the type of call trigger function 101 indicates that a call is of the type for which an adjunct may be necessary, the adjunct access trigger function 102 is invoked. Since the types of calls requiring adjunct access differ on a service-by-service basis, requirements for the type of call trigger function 101 must be defined on an application-by-application basis.

Regardless of what specific requirements are established for the type of call trigger function 101, OSW 12 performs an adjunct access trigger function 102 to determine whether an adjunct might need to be accessed on a given call. Thus, if an application defines a type of call trigger 101 for its use, the adjunct access trigger function 102 is performed by OSW 12. Otherwise, in the absence of a defined type of call trigger 101, the adjunct access trigger function 102 is performed by OSW 12 without requiring the type of call trigger function 101.

Figure 4:
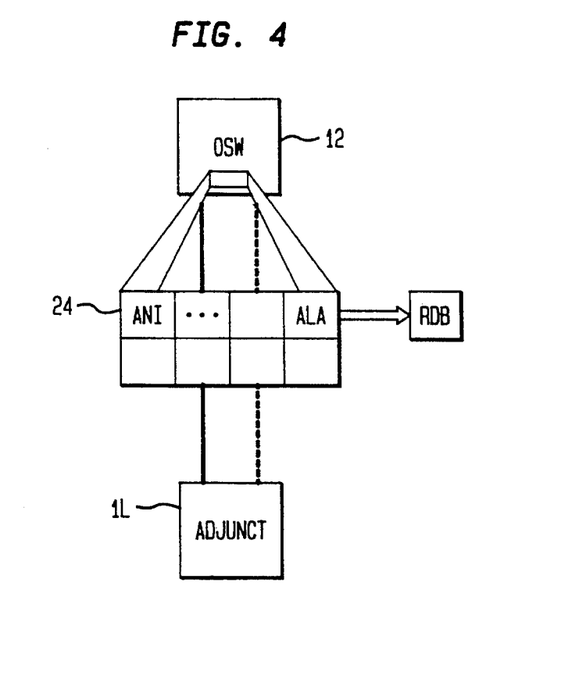
FIG. 4 is a diagram of a local adjunct connected to an originating switch in accordance with the present invention.
Figure 5:
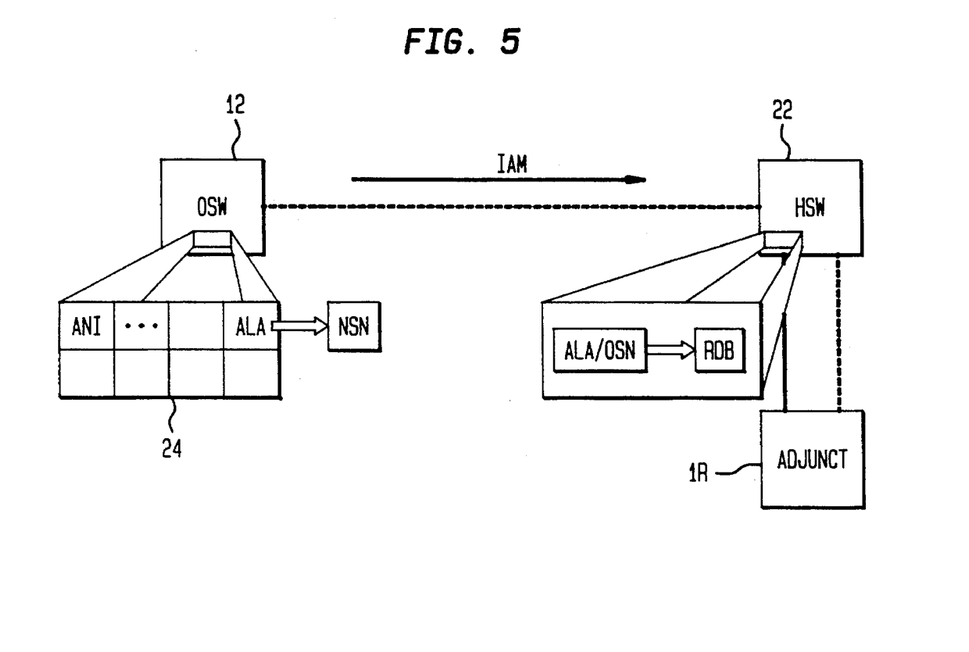
FIG. 5 is a diagram illustrating the routing of a call from an originating switch to a hand-off switch connected to a remote adjunct in accordance with the present invention.

As is illustrated in FIGS. 4 and 5, OSW 12 performs the adjunct access trigger function 102 to determine whether an adjunct may be necessary for a given incoming call. This is accomplished by accessing customer-specific data on a call maintained in OSW 12 to determine if an adjunct needs to be accessed based upon the customer's subscription to feature(s) or application(s) requiring adjunct access. Thus, OSW 12 maintains a trigger table 24 of customers for which an adjunct must be accessed on a call. This trigger table contains ANI's and their associated data of customers for which an adjunct must be accessed on a call. Data in the trigger table 24 are indexed based on the calling number/ ANI.

In order to ensure that ANI data is uniquely identified in the ANI trigger table 24 maintained in OSW 12, an Access Type Indicator and a Service Type Indicator are stored as part of the associated data in the ANI trigger table 24. The Access Type Indicator corresponds to the mode of access to OSW 12, i.e., direct, switched, or international access, wherein an adjunct is required. The Service Type Indicator corresponds to a customer service type, i.e., a specific business or consumer service, wherein an adjunct is also required.

In order to perform the adjunct access trigger function 102 to determine whether an adjunct is required for a particular incoming call, OSW 12 must determine the actual ANI, Access Type and Service Type (collectively referred to as "actual percall information") for that particular incoming call. OSW 12 will then compare the actual per-call information for that particular call to the information stored in the ANI trigger table 24 corresponding to the particular call (ANI).

When the actual per-call information (ANI, Access Type and Service Type) matches the information stored in the ANI trigger table 24, OSW 12 concludes that an adjunct is necessary for that particular call. When no match is found, OSW 12 concludes that an adjunct is not necessary for that particular call and the call is routed to DSW 16 through the normal prior art switching process (RTNR) 120.

In another embodiment of the present invention, the adjunct access trigger function 102 can be performed at DSW 16, rather than at OSW 12, for local adjuncts 1L connected to DSW 16. DSW 16 may contain a trigger table (not shown) containing destination numbers and their associated data for customers for which an adjunct must be accessed on a call. Like the preferred embodiment described above, the adjunct access trigger function 102 can be performed at DSW 16 by comparing actual per-call information to the information stored in the trigger table for a particular destination number to determine whether an adjunct may be required. If the actual per-call information matches that maintained in the trigger table, then an adjunct is deemed to be necessary. If there is no match, then an adjunct is deemed unnecessary for that particular call and the call is handled via normal call handling procedures 120.

Regardless of whether the adjunct access trigger function 102 is performed at OSW 12 or DSW 16, the trigger tables 24 contained in OSW 12 and DSW 16 contain data for each subscribed customer that is homed onto that respective switch.

Upon completion of the adjunct access trigger function 102 and a determination is made that an adjunct might need to be accessed on a particular call (pending performance of the application determination function 104 described below), OSW 12 or DSW 16 (depending upon which switch performs the adjunct access trigger function 102) must thereafter perform an adjunct addressing function 103, as illustrated in FIG. 7. Since multiple adjuncts may exist, the adjunct addressing function 103 determines which logical adjunct should be addressed.

For simplicity, the following description of the adjunct addressing function 103 will refer to OSW 12. It is understood, however, that the adjunct addressing function 103 may be performed at either OSW 12 or DSW 16 depending upon the embodiment of the present invention that is utilized.

Thus, if a particular call arrives at OSW 12 and matches both type of call screening 101 (if required) and adjunct access trigger screening 102, OSW 12 invokes its adjunct accessing function 103. OSW 12 determines an appropriate adjunct to access based upon the adjunct logical address (ALA) stored in the customer's associated ANI data in the adjunct access trigger table 24. The ALA indicated for the customer will identify the network address for one or more adjuncts which is stored as data in OSW 12.

For each adjunct logical address (ALA), OSW 12 will store the following information:

(1) an Application Indicator to select application-specific processing;

(2) an adjunct "on/off switch" that can be utilized to prevent calls from accessing an entire adjunct logical group;

(3) an "Adjunct Unavailable" Treatment Indicator to indicate the disposition and treatment to be used for calls that are unable to access any adjunct within the adjunct logical group; and (4) a Routing Data Block Indicator (RDB) or its equivalent that is utilized by the routing process to find the physical address(es) of the adjunct logical group.

Referring again to FIGS. 3A, 3B and 7, once the appropriate ALA is determined, OSW 12 (or DSW 16) invokes its application determination function 104 to determine what application is associated with that particular ALA. Preferably, each ALA will have only one application associated with it. However, multiple ALA's may be associated with the same application.

Figure 3B:
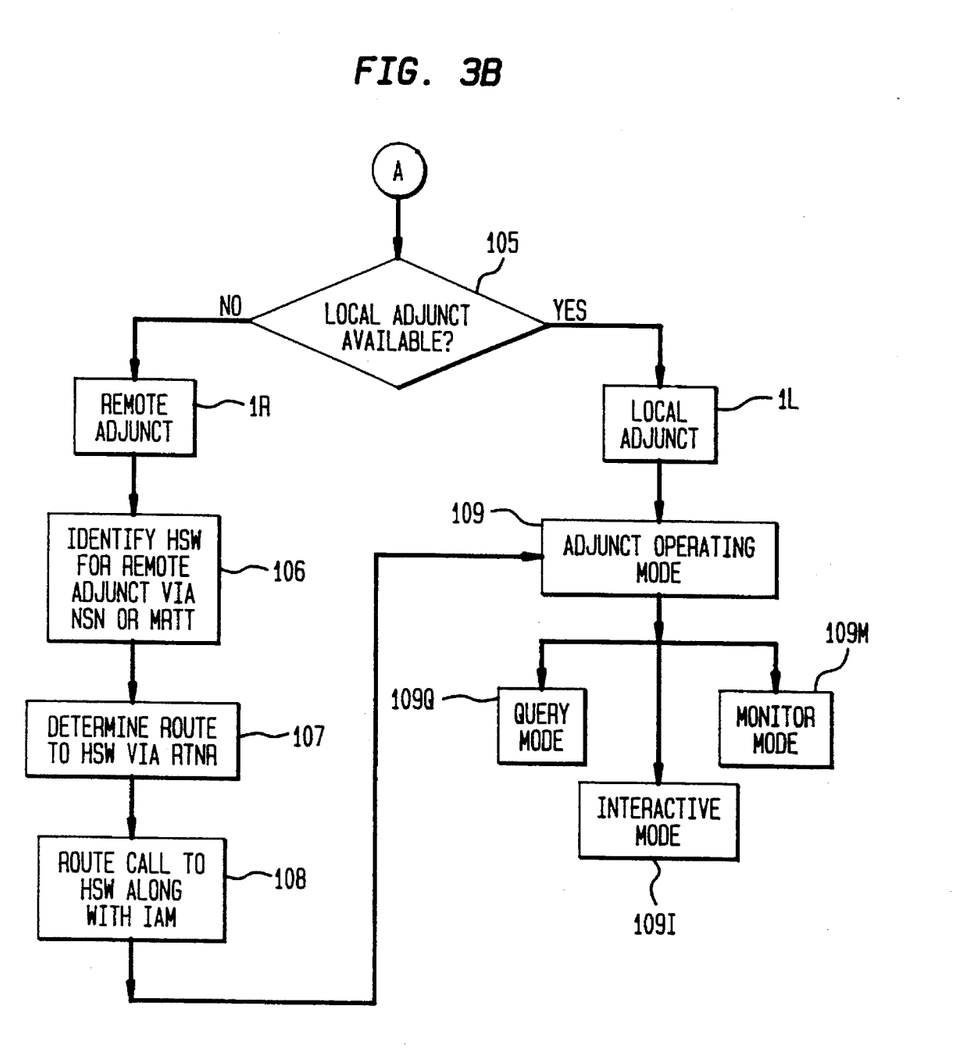

If, at the conclusion of the adjunct use determination function 104, an adjunct is required for a call, OSW 12 (or DSW 16) must determine if a local adjunct 1L directly connected to the switch is available (step 105 in FIG. 3B). A local adjunct 1L connected to OSW 12 is illustrated in FIGS. 2A and 4. The determination of whether a local adjunct is available is based upon the adjunct logical address (ALA) and associated information identified in the adjunct addressing function 103.

However, not every OSW 12 will have a local adjunct 1L capable of processing each adjunct-based application. Moreover, for any of a variety of reasons, the local adjunct 1L corresponding to the ALA identified in the adjunct addressing function 103 may be unavailable or non-existent. Therefore, it is necessary to provide a mechanism for accessing a remote adjunct 1R that is capable of processing the application for that particular call.

Figure 6:
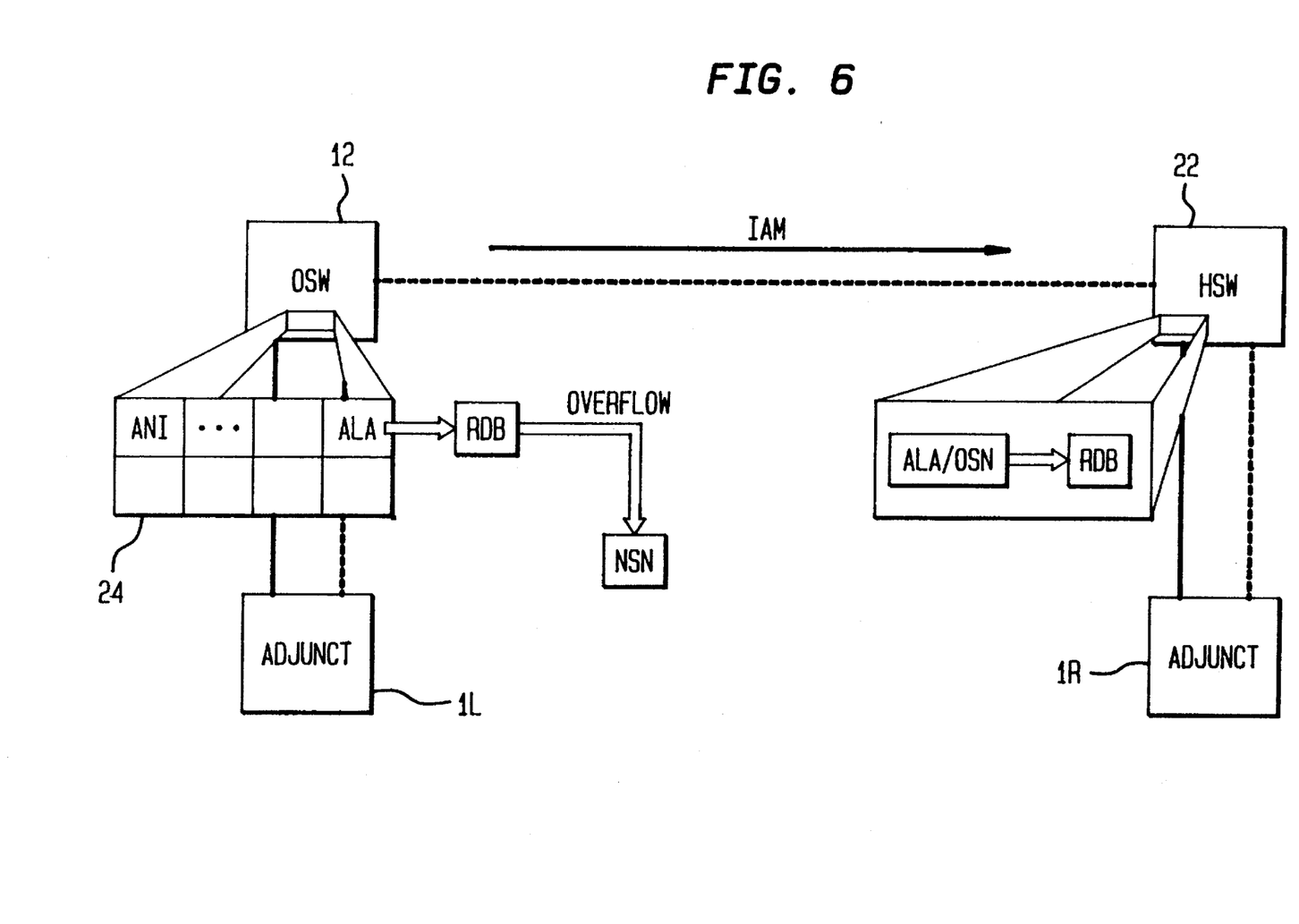
FIG. 6 is a diagram illustrating the backing up of a local adjunct by a remote adjunct in accordance with the present invention.

FIGS. 2B, 5 and 6 illustrate the routing of a call from OSW 12 to a hand-off switch (HSW) 22 that is connected to a remote adjunct 1R capable of processing the application for a particular call in accordance with the present invention. Based upon the adjunct use determination function 100, OSW 12 can identify one or more remote adjuncts 1R that are capable of processing the application for that call.

Specifically, the adjunct access trigger table 24 will contain the respective ALA's for one or more adjuncts (local or remote) that are capable of processing a particular application and that maintains customer records for that particular caller (ANI). This may include one or more adjuncts. Therefore, when a local adjunct 1L is absent or otherwise unavailable, OSW 12 may determine a remote adjunct 1R capable of processing the call based upon the ALA identified in the adjunct addressing function 103.

Each switch in the network is assigned a discrete network switch number (NSN). OSW 12 maintains a list of respective NSN's for hand-off switches (HSW) 22 that are connected to the remote adjunct 1R corresponding to each ALA. Therefore, once the ALA for the particular remote adjunct 1R is identified, OSW 12 can determine the appropriate NSN for the hand-off switch (HSW) 22 that is connected to the desired remote adjunct 1R (step 106 in FIG. 3B).

OSW 12 then determines the appropriate route to hand-off the call to HSW 22 corresponding to the appropriate remote adjunct 1R (step 107 in FIG. 3B). The method for determining this routing is known in the art as Real Time Network Routing (RTNR) and is fully described in U.S. Pat. No. 5,101,451.

When handing-off control of the call to HSW 22, OSW 12 transmits an Initial Address Message (IAM) to HSW 22, such as in the Common Channel Signalling No. 7 ISDN User Part (CCS7 ISUP) protocol. The IAM is a standard protocol message known in the art for conducting signalling between switches in a telecommunications network. However, in addition to the standard IAM, OSW 12 also transmits to HSW 22 the logical address (ALA) of the desired adjunct and routing and billing information (step 108 in FIG. 3B).

Furthermore, OSW 12 also transmits its discrete Originating Switch Number (OSN) that identifies that switch from any other switch. Therefore, in the event that a particular HSW 22 is connected to more than one adjunct $1R_1$, $1R_2$, $1R_3$, etc. (not shown) having the particular ALA identified in the adjunct addressing function, the transmitted OSN identifying OSW 12 is utilized by HSW 22 to determine the particular adjunct 1R containing a customer database corresponding to customers that are homed off of OSW 12.

As is readily apparent from the above description, the present invention can also be utilized to provide back-up capabilities in the event that an adjunct fails or becomes otherwise unavailable, or in the event that a trunk to HSW 22 becomes blocked. Referring now to FIG. 6, should the facilities to local adjunct 11 be unavailable, OSW 12 can overflow to a predetermined NSN corresponding to HSW 22 connected to an appropriate back-up adjunct 1R. Based upon the predetermined NSN, OSW 12 determines the appropriate route to HSW 22 utilizing RTNR. Thus, adjunct 1R may function as a back-up for adjunct 1L.

Figure 8:
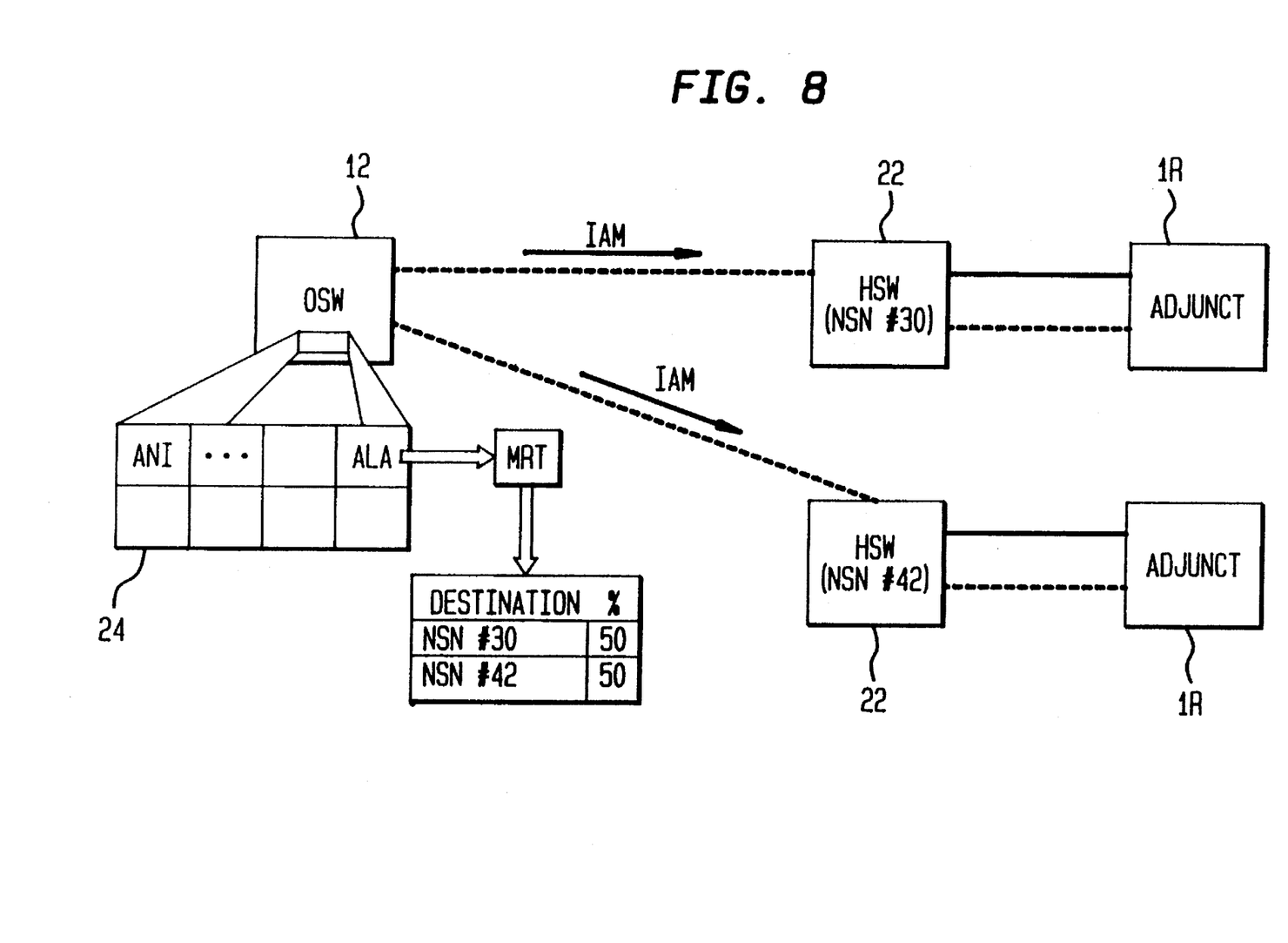
FIG. 8 is a diagram illustrating load sharing and backup between multiple adjuncts.

Additionally, the present invention is capable of evenly distributing the load between two or more adjuncts each containing identical customer information. As is illustrated in FIG. 8, OSW 12 utilizes a Multiple Routing Treatment Table (MRTT) to evenly distribute the load between two or more adjuncts. MRTT is a known routing structure that permits one to load share (evenly distribute calls between switches) up to eight different locations, as is fully described in U.S. Pat. No. 5,086,460.

The present invention is, therefore, capable of processing calls that require adjunct-based capabilities and selecting from a number of adjuncts located in the telecommunications network that are capable of processing the application for that particular call. Load sharing and adjunct back-up capabilities are provided by identifying each adjunct capable of processing the call and routing the call to any of the switches connected to the identified adjuncts.

Regardless of whether a local or remote adjunct is accessed, the switch connected to the desired adjunct (either OSW 12, DSW 16 or HSW 22, which are collectively referred to as "connecting switch") will send a set-up message to the adjunct, such as in the Q.931 protocol. The set-up message is processed by the adjunct by accessing the customer records maintained in the adjunct for the appropriate customer (identified by ANI or destination number). Referring to FIG. 3B, the adjunct will have three modes of operation: (1) query mode 109Q; (2) interactive mode 109I; and (3) monitor mode 109M.

Query mode 109Q is used for calls that require access to customer record information stored in the adjunct, but do not require any in-band interaction with the caller. In query mode, the connecting switch will be able to pass/retrieve information to/from the adjunct. Examples of such information may range from routing instructions to billing information and depends upon the service using the query mode. The voice path of the call does not terminate at the adjunct in the query mode 109Q. In query mode 109Q, therefore, the adjunct is released from the call (and free to process other calls).

Interactive mode 109I is utilized for services/features that require in bard interactions with the caller (such as prompting for dual tone multi-frequency (DTMF) input) during the set-up phase of the call. The call will be routed to the adjunct initially. After the caller interaction is complete, however, the adjunct will ask the connecting switch to redirect the call to its destination. That is, during the pre-answer phase of the call, the interactive mode 109I allows the adjunct to return control of the call to the connecting switch.

As in the query mode 109Q, the initial set-up message for the interactive mode 109I is sent to the adjunct by the connecting switch. However, rather than simply responding to the query and releasing the connecting path, the adjunct interactive mode 109I establishes a voice path in the network and towards the adjunct to allow the adjunct to play the appropriate application-specific announcements or prompts, and to collect any Dual Tone Multi-Frequency (DTMF) digits entered by the calling user. Upon completion of the processing in the interactive mode 109I, the adjunct transmits a disconnect message to the connecting switch and, depending upon the service or feature requested, the message may contain a redirection request, billing information, or other application-specific information.

Adjunct monitor mode 109M is utilized for calls that require caller interaction after the initial set-up phase of the call. This would include calls that require interaction after the call has been answered, as well as for any services that allow the caller to spontaneously enter in-band DTMF codes. In the adjunct monitor mode 109M, a call will be routed from the connecting switch to the adjunct and will be "hairpinned" (a u-turn) through the adjunct to connect the call back to the connecting switch through a second voice path. The call path is then completed to its destination from the connecting switch.

In the monitor mode 109M, the adjunct is therefore connected to the call path for the duration of the call to perform such functions as, for example, playing announcements and receiving DTMF digits entered by either the originating or terminating party. Thus, in monitor mode 109M, the adjunct remains connected to the call path until either the caller disconnects or until the application logic in the adjunct clears the call.

A given call will utilize one or more of the three above-described adjunct modes depending upon whether the service(s)/feature(s) that apply to the call require in-band interaction (announcement and/or digit collection) and at what point during the call interaction is required. The adjunct is responsible for determining which modes are required for a particular call (step 109 in FIG. 3B).

Thus, upon receipt of a set-up message from the connecting switch, the adjunct processes the set-up message by accessing customer records maintained in the adjunct for the appropriate customer (ANI or destination number). If the adjunct determines that no additional modes (other than query mode 109Q) are needed for the call, the adjunct returns the result of the query to the connecting switch and the adjunct interaction is complete for the call.

If, however, the adjunct determines that interactive mode 109I (and possibly monitor mode 109M) is required for the call, the adjunct establishes interactive mode 109I with the switch and stays in interactive mode until either:

(a) the adjunct determines, based upon its processing of data (DTMF digits) entered by the customer and customer-specific application data residing in the adjunct, that no further switch-adjunct interaction is necessary. At that time, the adjunct returns control of the call to the connecting switch with any necessary data, including a redirection number. The connecting switch then establishes the call to the redirection number.

(b) the adjunct determines, based upon its processing of data (DTMF digits) entered by the customer and customer-specific application data residing in the adjunct, that monitor mode 109M is required, at which point monitor mode 109M is established (for calls requiring both interactive and monitor mode, monitor mode 109M is not initiated by the adjunct until such time as monitor mode is needed).

(c) the calling party disconnects.

(d) the adjunct determines that the call should be disconnected and initiates clearing of the call.

If, in processing the initial set-up message, the adjunct determines that, based upon customer-specific application data residing in the adjunct, monitor mode 109M is needed immediately for the call, the adjunct initiates monitor mode 109M. Once monitor mode 109M is initiated, it will exist until the calling party disconnects or the application logic in the adjunct clears the call.

Since the number of voice paths established between the connecting switch and the adjunct are limited, the mode determination scheme 109 of the present invention is devised to use the least resource-intensive mode on a call. Thus, while in query mode 109Q, only features requiring query mode will be processed. While in interactive mode 109I, only features requiring interactive or query mode will be processed. While in monitor mode 109M, any feature requiring monitor, interactive or query mode will be processed.

As discussed above, the adjunct's determination of which mode is required (step 109 in FIG. 3B) at any given point in the call is based on the combination of the contents of the adjunct's customer-specific application data, customer-entered DTMF digits and, possibly, call information sent from the connecting switch to the adjunct.

It is to be understood that the above description is only of two preferred embodiments of the present invention. Numerous other arrangements may be devised by one skilled in the art without departing from the spirit and scope of the invention. The invention is thus limited only as defined in the accompanying claims.

What is claimed is:

1. In a telecommunications system having a plurality of switches, a method of accessing an adjunct for handling adjunct-based applications remote from an originating switch when a local adjunct connected to said originating switch is unavailable, comprising the steps of:

(a) determining whether a given telephone call requires an adjunct;

(b) determining the type of adjunct that may be necessary to process the adjunct-based application for that given telephone call;

(c) identifying the logical address of a remote adjunct capable of processing said application based upon the type of adjunct required;

(d) identifying a hand-off switch having a communication path to the remote adjunct;

(e) selecting a route from said originating switch to said hand-off switch;

(f) transmitting data from said originating switch to said hand-off switch;

(g) transmitting information between said hand-off switch and the remote adjunct to process the adjunct-based application for the particular call; and (h) determining the operating mode of the remote adjunct based upon customer-specific application data contained in the remote adjunct.

2. The method of claim 1 wherein said steps of determining whether a given call requires an adjunct and the type of adjunct necessary comprise the step of accessing customer-specific data corresponding to a specific customer's subscription to applications requiring adjunct processing.

3. The method of claim 2 wherein said steps of determining whether a given call requires an adjunct and the type of adjunct required are performed at the originating switch.

4. The method of claim 3 further comprising the steps of:

(a) maintaining a trigger table in said originating switch comprising automatic number identifications corresponding to originating telephone numbers and their associated data;

(b) comparing actual information from a specific originating call to said associated data maintained in said trigger table corresponding to the automatic number identification for said specific call's originating number; and (c) determining that an adjunct is required for said specific call when said actual information matches said associated data maintained in said trigger table.

5. The method of claim 4 wherein said associated data for specific automatic number identifications maintained in said trigger table comprises:

(a) an access type indicator corresponding to the mode of access to said originating switch when an adjunct-based application is required; and (b) a service type indicator corresponding to the customer service wherein an adjunct-based application is required.

6. The method of claim 5 wherein said associated data further comprises an adjunct logical address corresponding to a remote adjunct capable of processing the adjunct-based application for the particular call.

7. The method of claim 6 wherein the hand-off switch having a communication path to the remote adjunct is identified from the logical address for the particular adjunct maintained in the trigger table.

8. The method of claim 1 wherein the step of selecting a route to said hand-off switch is performed using real-time network routing.

9. The method of claim 1 wherein the data transmitted from said originating switch to said hand-off switch comprises:

(a) an initial address message;

(b) the logical address of the remote adjunct; and (c) routing and billing information.

10. The method of claim 9 wherein the data transmitted from said originating switch to said hand-off switch further comprises an originating switch number that identifies said originating switch, the originating switch number being utilized by said hand-off switch to further identify a remote adjunct having a customer database corresponding to customers homed off said originating switch.

11. The method of claim 1 further comprising the steps of:

(a) transmitting a set-up message and query from said hand-off switch to the remote adjunct;

(b) maintaining customer records in the remote adjunct;

(c) processing said set-up message and query as directed by service logic within the remote adjunct by accessing the customer records for the particular customer corresponding to the call maintained in the remote adjunct;

(d) transmitting a response to said query from the remote adjunct to said hand-off switch;

(e) determining whether further processing is required depending upon the application being processed; and (f) terminating the communication path to the remote adjunct when no further processing by the remote adjunct is required.

12. In a telecommunications system having a plurality of switches and adjuncts, a method of selecting and accessing an adjunct capable of processing an adjunct-based application for a particular call, comprising the steps of:

(a) determining whether a given telephone call requires an adjunct;

(b) determining the type of adjunct that may be necessary to process the adjunct-based application for that given telephone call;

(c) identifying the logical address of one or more adjuncts capable of processing said application based upon the type of adjunct required;

(d) determining whether a local or a remote adjunct is to be accessed;

(e) selecting an adjunct from said identified adjuncts and transmitting information to the selected adjunct to process the adjunct-based application for the particular call; and (f) determining the operating mode of the selected adjunct based upon customer-specific application data contained in the selected adjunct.

13. The method of claim 12, further comprising the steps of:

(a) identifying a hand-off switch having a communication path to a remote adjunct if no local adjunct is available;

(b) selecting a route to said hand-off switch; and (c) transmitting data to said hand-off switch.

14. The method of claim 12 wherein said steps of determining whether a given call requires an adjunct and the type of adjunct necessary comprise the step of accessing customer-specific data corresponding to a specific customer's subscription to applications requiring adjunct processing.

15. The method of claim 14 wherein said steps of determining whether a given call requires an adjunct and the type of adjunct required are performed at the originating switch.

16. The method of claim 15 further comprising the steps of:

(a) maintaining a trigger table in said originating switch comprising automatic number identifications corresponding to originating telephone numbers and their associated data;

(b) comparing actual information from a specific originating call to said associated data maintained in said trigger table corresponding to the automatic number identification for said specific call's originating number; and (c) determining that an adjunct is required for said specific call when said actual information matches said associated data maintained in said trigger table.

17. The method of claim 16 wherein said associated data for specific automatic number identifications maintained in said trigger table comprises:

(a) an access type indicator corresponding to the mode of access to said originating switch when an adjunct-based application is required; and (b) a service type indicator corresponding to the customer service wherein an adjunct-based application is required.

18. The method of claim 17 wherein said associated data further comprises an adjunct logical address corresponding to an adjunct capable of processing the adjunct-based application for the particular call.

19. The method of claim 18 wherein the switch having a communication path to the selected adjunct is identified from the logical address for the particular adjunct maintained in the trigger table.

20. The method of claim 13 wherein the step of selecting a route to said hand-off switch is performed using real-time network routing.

21. The method of claim 13 wherein the data transmitted from said originating switch to said hand-off switch comprises:

(a) an initial address message;

(b) the logical address of the selected adjunct; and (c) routing and billing information.

22. The method of claim 21 wherein the data transmitted from said originating switch to said hand-off switch further comprises an originating switch number that identifies said originating switch, the originating switch number being utilized by said hand-off switch to further identify an adjunct having a customer database corresponding to customers homed off said originating switch.

23. The method of claim 12 further comprising the steps of:

(a) transmitting a set-up message and query from a switch to the selected adjunct;

(b) maintaining customer records in the selected adjunct;

(c) processing said set-up message and query as directed by service logic within the selected adjunct by accessing the customer records for the particular customer corresponding to the call maintained in the selected adjunct;

(d) transmitting a response to said query from the selected adjunct to the switch;

(e) determining whether further processing is required depending upon the application being processed; and (f) terminating the communication path to the selected adjunct when no further processing by the selected adjunct is required.

24. An apparatus for routing a call to an adjunct capable of processing an adjunct-based application in a telecommunications network having a plurality of switches, comprising:

control means, comprising storage for a trigger table containing customer-specific data and a program, responsive to data stored in said table and operable under control of said program for:

(a) responsive to an incoming call and to data stored in said trigger table, determining whether a given call requires an adjunct;

(b) determining the type of adjunct that may be necessary to process the adjunct-based application for that given telephone call;

(c) identifying the logical address of a desired adjunct capable of processing said application based upon the type of adjunct required;

(d) identifying the connecting switch having a communication path to the desired adjunct;

(e) selecting a route to said connecting switch; and (f) transmitting data to said connecting switch.

25. The apparatus of claim 24 further comprising means for comparing actual information from a specific incoming call to data maintained in said trigger table.

26. In a telecommunications system having a plurality of adjuncts and a plurality of switches each connected to one or more of said adjuncts, a method of selecting and accessing an adjunct capable of processing an adjunct-based application for a particular call, comprising the steps of:

(a) determining whether a given telephone call requires an adjunct;

(b) determining the type of adjunct that may be necessary to process the adjunct-based application for that given telephone call;

(c) identifying the logical addresses of a plurality of adjuncts capable of processing said application based upon the type of adjunct required; and (d) selecting a particular adjunct from the identified plurality of adjuncts by distributing the load between said identified adjuncts capable of processing said application so that a fraction of the total number of telephone calls requiring the determined type of adjunct are routed to each of said identified adjuncts.

27. The method of claim 26, further comprising the steps of:

(a) identifying a hand-off switch having a communication path to said selected adjunct when said selected adjunct is not locally connected to an originating switch;

(b) selecting a route to said hand-off switch; and (c) transmitting data to said hand-off switch.

28. The method of claim 27, further comprising the steps of:

(a) selecting an additional adjunct from said identified adjuncts capable of processing said call;

(b) identifying a switch having a communication path to said additional adjunct;

(c) selecting a route to said identified switch; and (d) transmitting data to said identified switch.

* * * * *